United States Patent Office 3,280,659
Patented Oct. 25, 1966

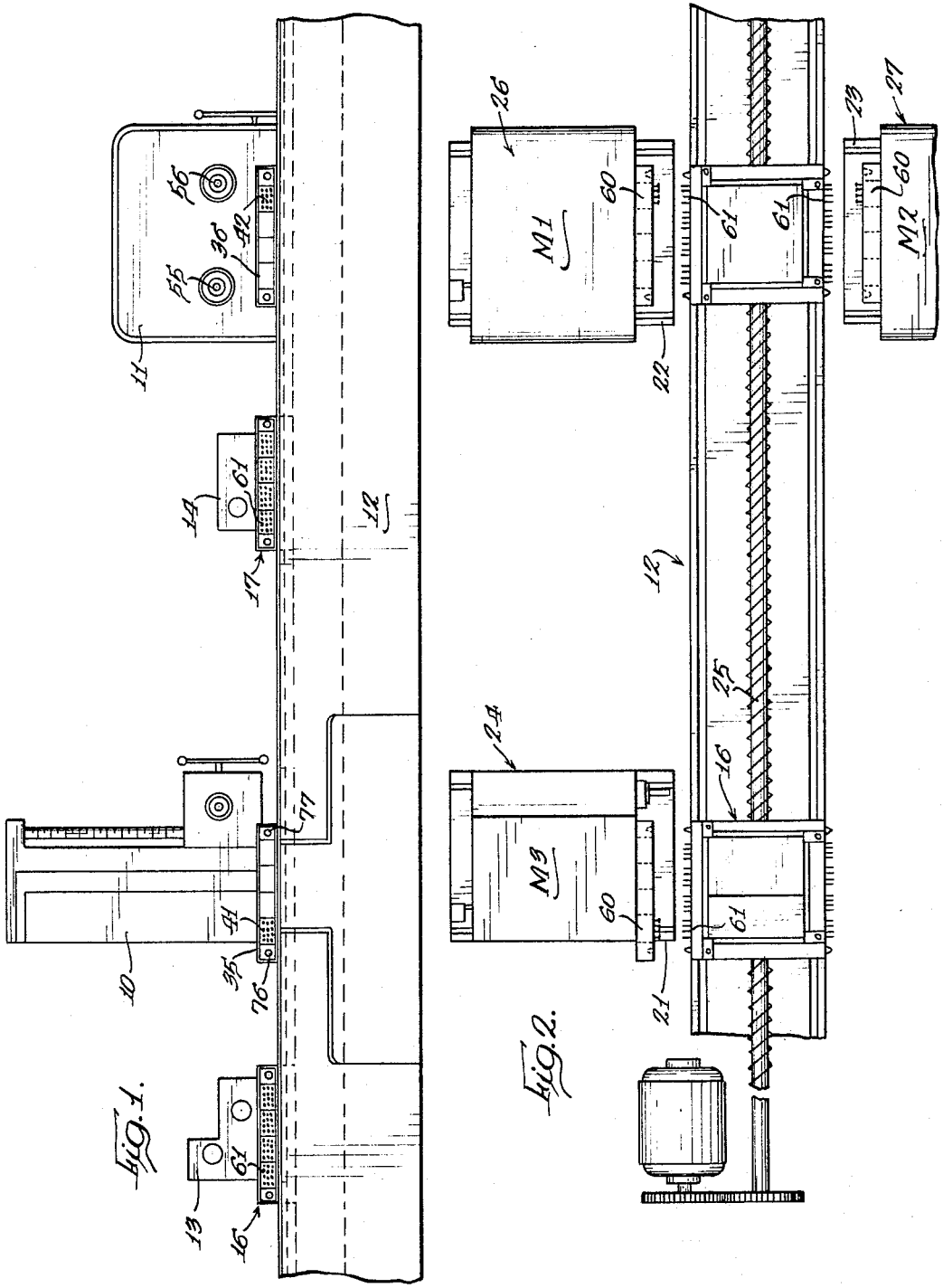

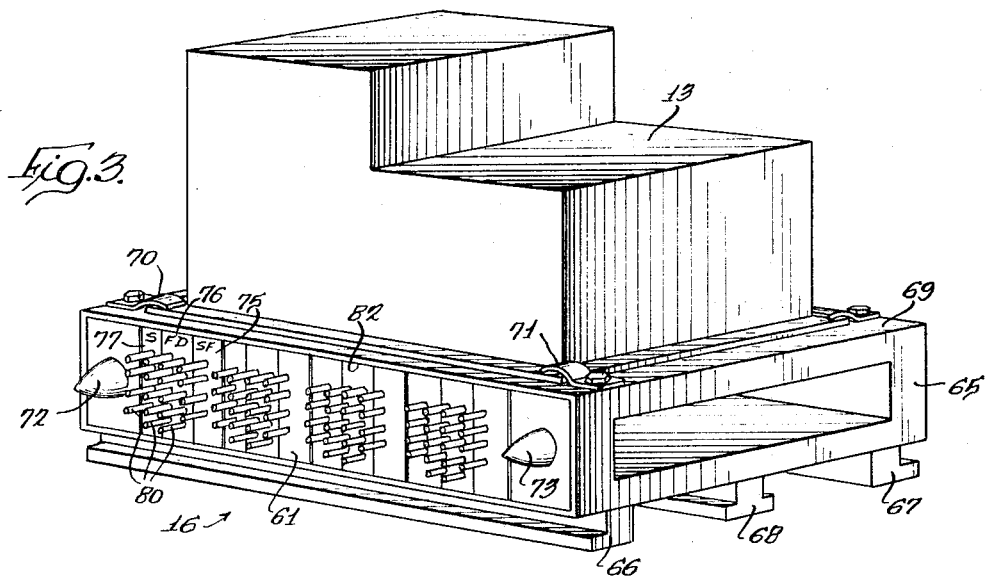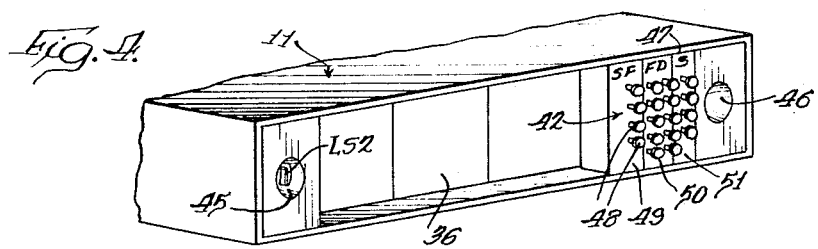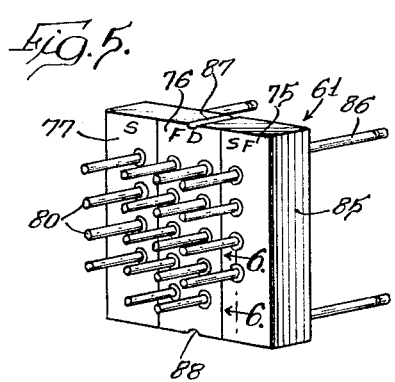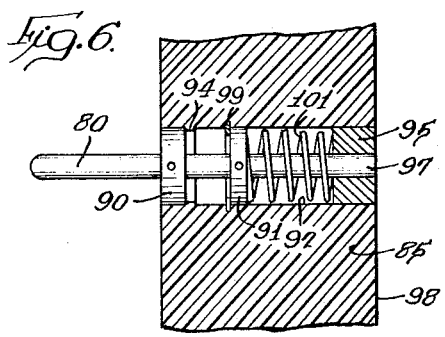

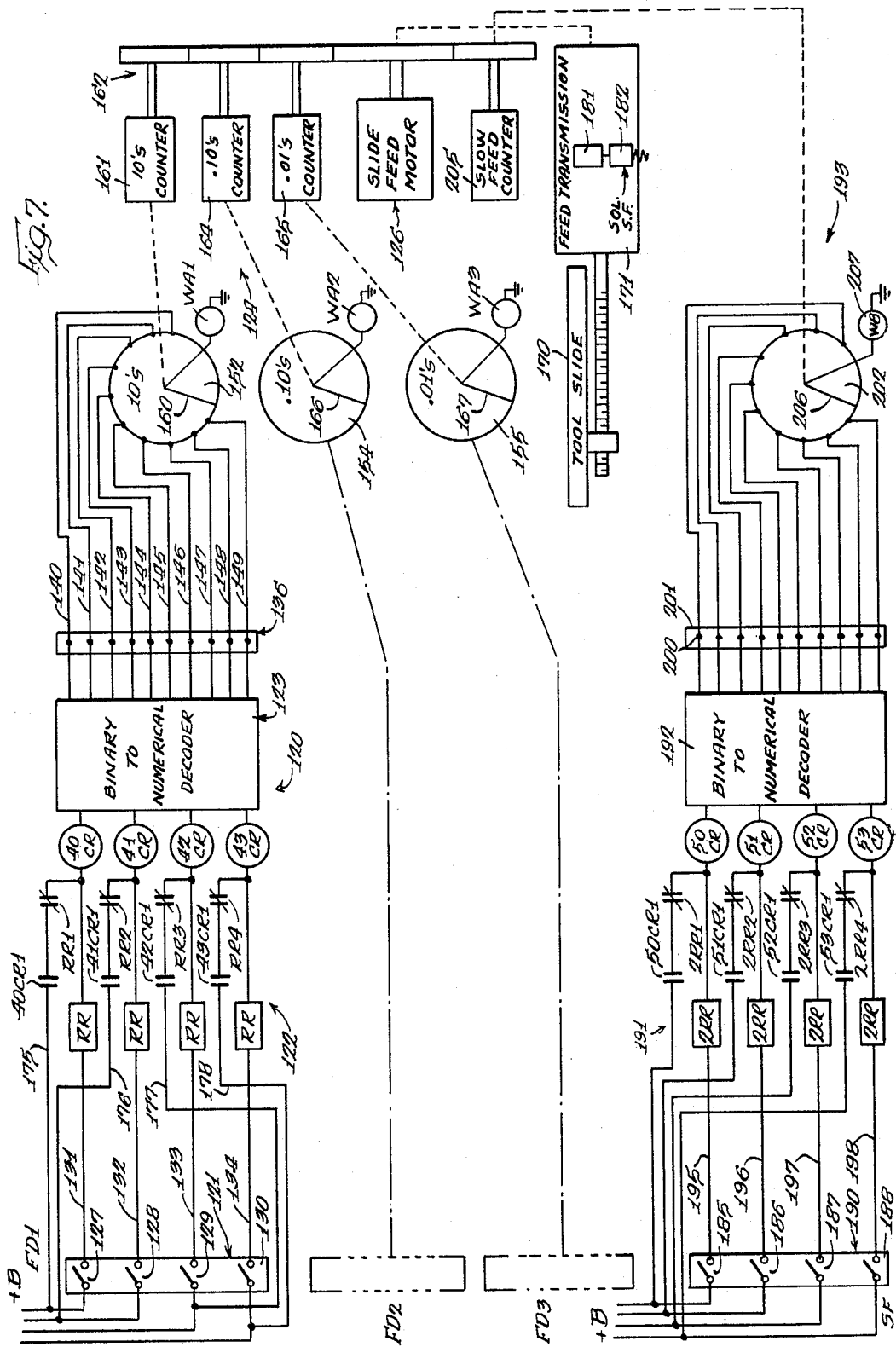

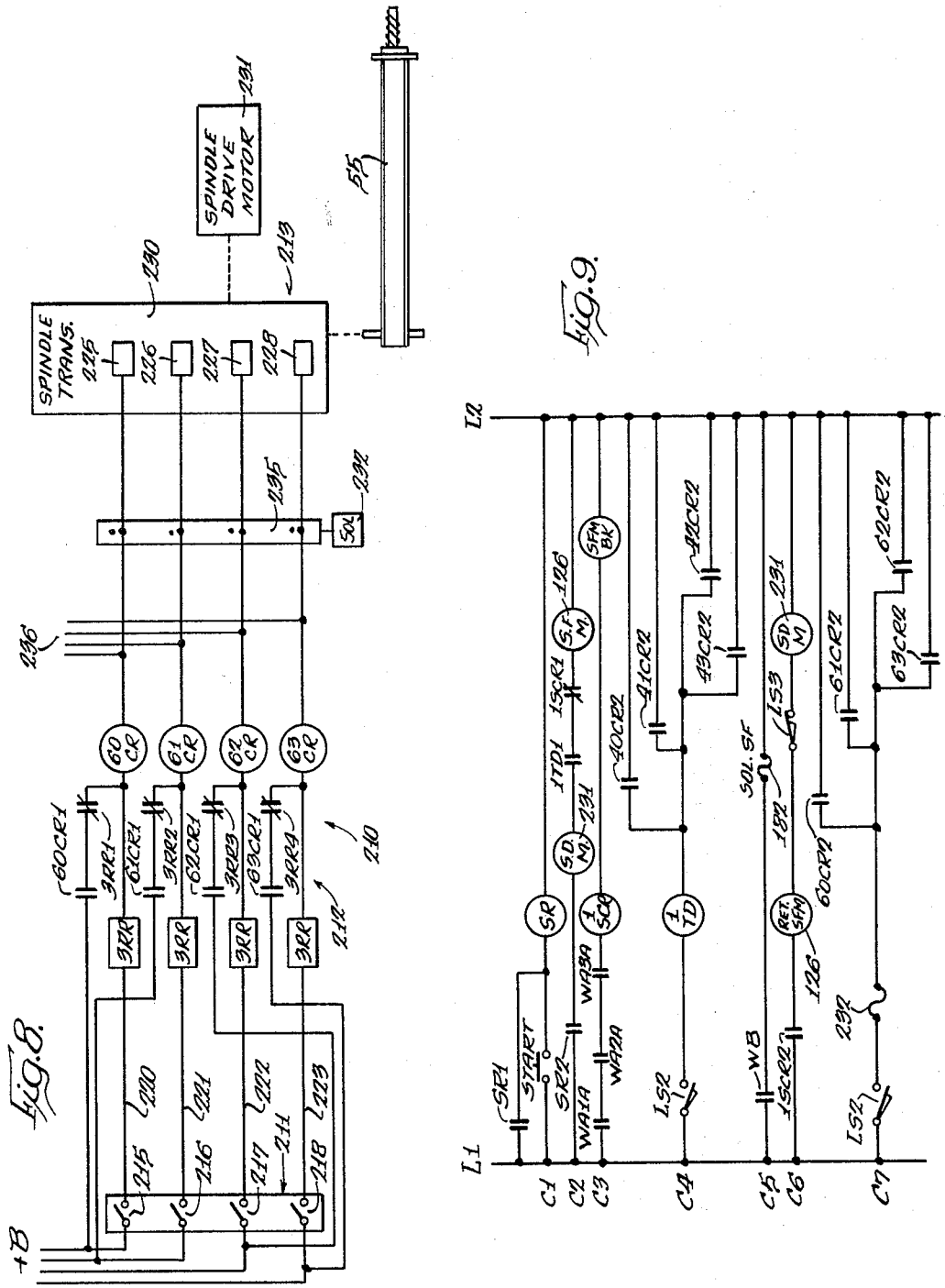

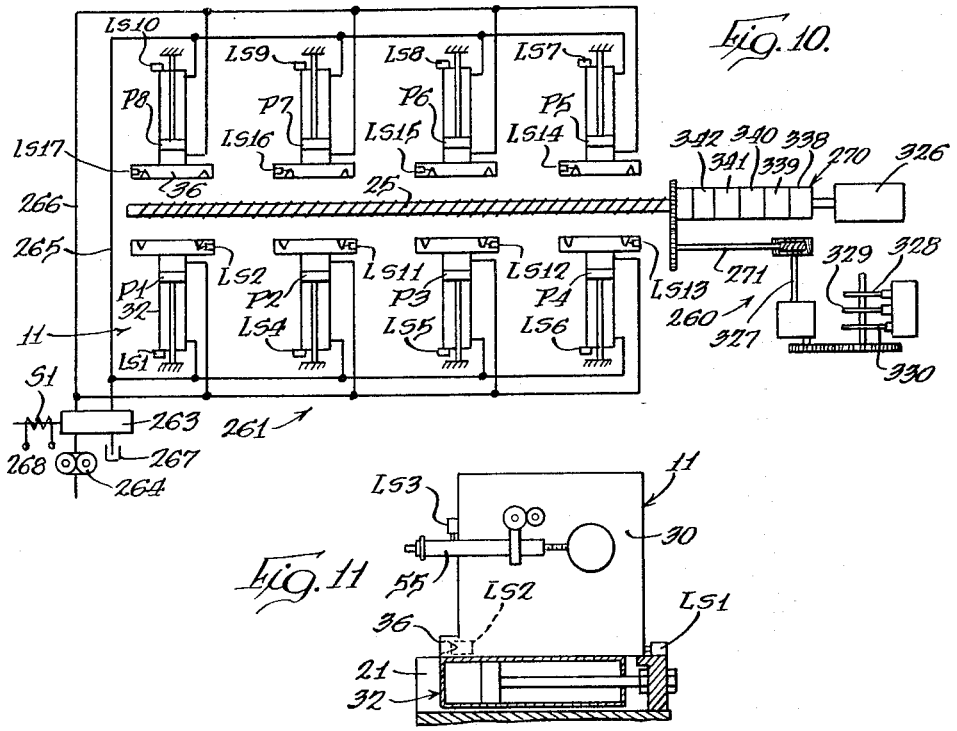
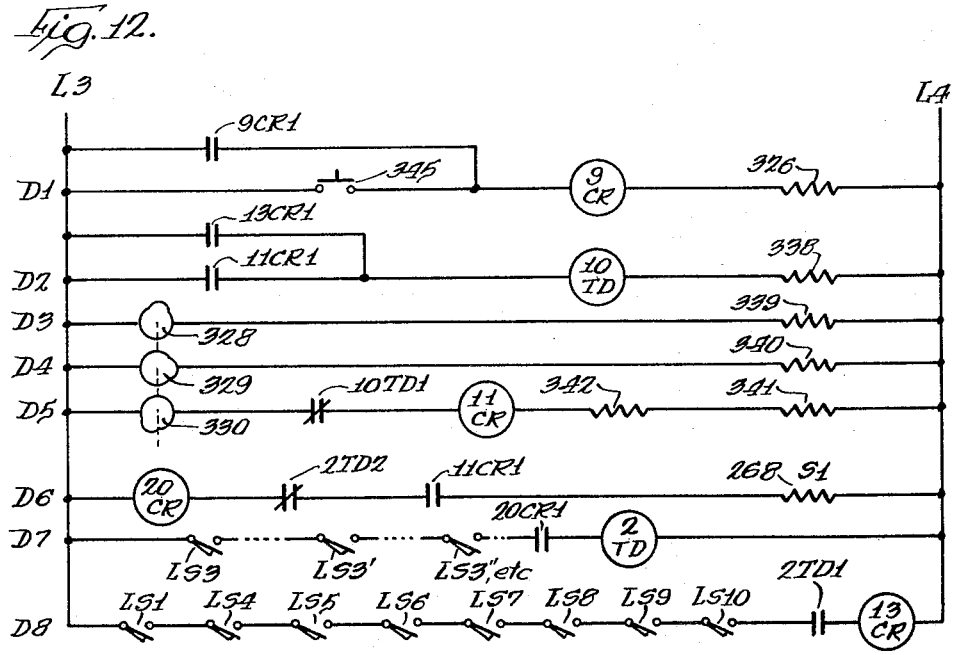

3,280,659
MACHINE TOOL
Dillis V. Allen, 940 Beau Drive, Des Plaines, Ill.
Filed Apr. 20, 1965, Ser. No. 449,546
25 Claims. (Cl. 77—1)

This invention relates to machine tools and more particularly to automatic program machinery.

In the past there have been provided two general classes of automated machinery. The first is what might be termed as a fixed program machine which is set up to perform a predetermined sequence of operations on a workpiece, or more commonly, on a series of workpieces. An example of this first class may be found in the automated machine tool production lines for cylinder blocks such as are presently being used in the automobile industry. As these production lines must perform identical machining operations on large quantities of workpieces, the long setup time required for such lines is economically small compared to the number of machined workpieces in between changes in setups.

The second class of automated machines may be termed data programmed machine tools. An exemplary machine of this type includes a binary coded tape containing coded data representing the desired machine functions, a reader and decoder for sensing the data on the tape and converting it into numerical form, and servo-mechanisms for positioning and driving the machine components in accordance with the commands of the tape. These data controlled machines have been largely used for short run productions. The reasons for the present limited use of data controlled machines are many fold. One reason is because of the high cost of the data programmed machines, it is less expensive to employ the fixed program type of machine described above as the first class for long run productions. Another reason is that it has been found extremely difficult to coordinate a tape controlled machine into the flow of large quantities of workpieces through a production line.

It is in this background that applicant has provided a data controlled machine tool compatible with a production line heretofor limited to the fixed program type of machine tool. To accomplish this applicant has provided a traveling work cradle or workholder that programs each machine as it travels down the production line so that each machine tool machines the respective workpieces in accordance with the commands of a program carried with the workpiece itself. The advantages of such a system are many fold. Firstly, the tape driving mechanisms conventionally associated with data programmed machines are completely eliminated. In the present system this function is in effect accomplished by the conveyor which carries the workpiece from machine to machine along the production line. Secondly, and very important, the present device eliminates the interrelated controls which would be necessary if a tape controlled machine were incorporated into a production line. More specifically, the reading, storage and control functions would have to be coordinated with suitable electric circuitry to the movements of the workpieces and their arrival at each machine station. In the present device the need for such interrelated controls is completely obviated because the machine is programmed by the work carrier and the work carrier necessarily arrives at the work station simultaneously with the workpiece.

It is contemplated that the present programmed production line be usable for both short run and long run productions. There are provided storage registers in each of the machine tools in the production line for storing data sensed from the lead workpiece in a series of identical workpieces, and means associated with the register for repeating the command functions on all succeeding workpieces until a workpiece arrives with a new program on its associated work carrier. When the lead workpiece of the next run of workpieces of a different type arrives at each machining station, the new program itself simultaneously clears the registers of data corresponding to the previous run and resets the register with data for the following run of workpieces. In this manner the present device provides a repeating function so that it is only necessary to program the lead workpiece in each series of workpieces that are to be machined identically.

In association with the repeating function of the present programmed machine tools, the storage registers and control circuits provided in each of the machines on the production line are adapted to repeat only selected functions if so desired. To accomplish this each register is arranged so that only the portion of the register containing data corresponding to a changed function will be cleared by a new program and the remainder of the register will continue to store data corresponding to the unchanged functions. With this arrangement it is only necessary to program the lead workpiece of a series with data corresponding to the functions that are different from the functions associated with the previous series of workpieces, thus eliminating a great deal of programming time on the work carriers. An example of this would be where one machine in the line is supposed to drill holes at the same speed and at the same location but at different depths on two successive series of workpieces which have a generally different program. In this case the program on the lead workpiece of the first series would set up the drilling tool location, feed rates, and the first depth. The lead program on the second series for the drilling machine need only carry feed depth data, and the machine will automatically repeat the previous depth function until cleared by a new program for that specific function.

It is therefore a primary object of the present invention to provide a new and improved apparatus for performing sequential operations on an advancing line of workpieces in which the source of data for controlling the operations is advanced with the workpieces.

It is another object of the present invention to provide a new and improved workholder having data storage means affixed thereto and arranged on the workholder so that when it is positioned adjacent a machine tool it will program the operations of the machine on the workpiece.

A more specific object of the present invention is to provide a workholder of the character described having a plurality of programs arranged thereon with each program adapted to control the functions of a different machine tool. Each of these programs take the form of a phenolic plastic plate releasably attached to the workholder with resettable plungers thereon arranged to be coded in binary form. The program plates are extremely durable and may be reused many times.

A further object of the present invention is to provide a new and improved data controlled machine tool having an exposed reading head adjacent the working side of the machine so that the machine may be programmed by a data storage means adjacent that side of the machine.

A still further object of the present invention is to provide a new and improved machine tool production line having a conveyor for advancing the workpieces from one machine station to another along the line; a plurality of programs, one corresponding to each machine tool, advanced with and adjacent the workpieces for controlling the machining operations; sensing or reading heads at each machine station adapted to read only the program associated with that particular machine, data storage registers in each of the machines for storing data so that only the lead workpiece in a series or run need carry a program therewith, locating members associated with each machine and with each program to align the machine tools with the programs and with the workpieces; and control means for each of the machine tools for controlling the machine functions in accordance with the commands of the programs.

Other objects and advantages of the present invention will become readily apparent from the following detailed description taken in connection with the following drawings in which:

FIG. 1 is a fragmentary side elevation of a machine tool production line incorporating the present invention;

FIG. 2 is a fragmentary plan view of the production line showing the relationship between the programs on the workholders and the reading heads on the machine tools;

FIG. 3 is a perspective view of a workholder or work carrier;

FIG. 4 is a fragmentary perspective view of one of the machine bases showing the associated reading head;

FIG. 5 is a perspective view of one of the programs on the workholder shown in FIG. 3;

FIG. 6 is a fragmentary cross section taken generally along line 6—6 of FIG. 5 showing a resettable plunger assembly;

FIG. 7 is a schematic drawing of a data storage and control circuit for controlling the spindle depth function in one of the machine tools shown in FIG. 1;

FIG. 8 is a schematic drawing of a data storage and control circuit for controlling the spindle speed function in one of the machine tools shown in FIG. 1;

FIG. 9 is a schematic drawing of a control circuit for sequencing the functions illustrated in FIGS. 7 and 8;

FIG. 10 is a schematic drawing of the hydraulic circuit for moving the machine tools into engagement with the work carriers shown with a portion of the conveyor drive apparatus;

FIG. 11 is a schematic side elevation of one of the machine tools of FIG. 1; and FIG. 12 is a schematic drawing of a control circuit for the conveyor shown in FIGS. 1 and 2.

While an illustrative embodiment of the present invention is shown and described it will be understood that the present disclosure is to be taken as an exemplification of the principles of the invention and is not intended to limit the invention to the embodiment illustrated. The scope of the invention will be pointed out in the appended claims.

Referring to FIG. 1 wherein a portion of the machine line is shown with a boring machine 10 and a multiple spindle horizontal drilling machine 11 arranged adjacent a work advancing conveyor 12. As will appear in more detail hereinafter the conveyor 12 advances workpieces, such as workpieces 13 and 14, from one machine station to another along the conveyor 12. While particular types of machines have been shown in FIG. 1, it should be understood that other types of machine tools, such as end milling machines, contour milling machines, jig borers and others, may be employed as well.

The workpieces are carried by workholders or work carriers 16 and 17 which engage a lead screw 20 in the conveyor 12 as shown more clearly in FIG. 2.

Each of the machine tools on the production line have a stationary base such as bases 21, 22, and 23 on machines 25, 26, and 27 respectively, FIG. 2. The lowermost carriage of each machine is mounted for horizontal reciprocating movement on the stationary base member. For example, machine 25 shown in FIG. 10 has a carriage 30 mounted for reciprocating motion on the stationary base member 21 by a piston and cylinder arrangement generally designated by the numeral 32. Locating heads are fixed to the lowermost carriage on each of the machines and reciprocate toward and away from the conveyor therewith. The locating heads on machine 10 and 11 in FIG. 1 are designated 35 and 36.

The purpose of the piston and cylinder assembly 32, one of which is associated with each machine, is to advance the entire machine into its operating position adjacent the workholder and workpiece after the workpiece arrives at the machining station. It should be understood that any number of tool carriages and slides may be carried by the lowermost reciprocating carriage member. In this manner the movement of the tool slides and carriages may be programmed using the lowermost carriage as a reference rather than the stationary base 21, as tool movement does not begin until the machine and the locating heads thereon have been moved into a working position adjacent the workpieces.

Each of the locating heads has a reading head thereon, such as reading heads 41 and 42 associated respectively with machines 10 and 11 shown in FIG. 1.

Referring to FIG. 4 wherein the reading head 42 on machine 11 is shown in detail, it should be understood that similar reading heads are associated with each machine; however, they differ in their location on the locating heads. The reading head 42 is positioned a predetermined distance from each of the locating apertures 45 and 46 on the forward face 47 of the locating head 36. The purpose of the specific spacing of the reading head 42 will be described below. Reciprocating plungers 48 extend from the reading heads and are adapted to actuate switches in a machine tool control circuit which will be described fully hereinafter. The plungers 48 are arranged in channels 49, 50 and 51 which correspond to the functions of the associated machine. The plungers in channel 49 are adapted to control the position of the drilling spindles 55 and 56 when the slow feed (SF) begins on the drilling machine 11. The plungers in channel 50 control the final position of the spindles 55 and 56 which may be termed feed depth (FD). The plungers in channel 51 are adapted to control the speed (S) of rotation of the spindles 55 and 56. While the machine functions associated with the channels 49 to 51 are those of a drilling machine, it should be understood that other types of machine tools have different functions and therefore would have correspondingly different reading channels on their associated reading heads.

Each of the reading heads 41 and 42 sense binary coded data contained on the work carriers 16 and 17. Referring to FIG. 2, as the workholders 16 and 17 are advanced from one machine station to another the reading heads 60 on each machine sense binary coded data on the workholders themselves corresponding to the particular machine functions. Referring now to FIG. 3 wherein the work carrier 16 is shown in detail, it should be understood that all of the work carriers on conveyor 12 are identical except for the information programmed thereon. In the embodiment shown the means provided on the workholders for storing the data are coded plunger plates 61. It should be understood that other means for storing the coded data on the workholders may be provided such as magnetic spots on sensitive plates or punch cards, etc. However, the plunger plates shown have been selected because of their durability and other advantages as will appear hereinafter.

One plunger plate 61 is provided for each operational machine along the production line. The plates contain all the data necessary to control all the functions of the machines so that the production line is completely automatic. As shown in FIG. 2, the coded plates are arranged in side by side fashion along both sides of the workholders 16 and 17. The reading heads 60 are positioned on the machine so they read only the information on one of the coded plates 61 on each work carrier. For example, reading head 41 in FIG. 1 will read data on the coded plate 61 that is located leftmost on the work carriers on the side of the work carriers adjacent the machine. The reading head 42 on machine 11 will read data on the second coded plate 61 from the left side of the workholders.

Any number of coded plates may be provided on each side of the workholders so that a single workholder may program may machines on both sides of the conveyor 12.

225, 226, 227 and 228, respectively, in a spindle transmission 230. No binary decoder is necessary in the control circuit 210 because the clutches 225 to 228 may be selectively actuated directly in binary fashion.

A spindle drive motor 231 is provided for rotating the drilling spindles 55 and 56 through the transmission 230 at a speed determined by the selected combination of actuated clutches. Note that there are 16 combinations of actuated clutches and thus 16 spindle speeds. It should be understood that any number of desired spindle speeds may be provided by employing more clutches. A solenoid 232 actuates a switch bank which selectively connects the line 220 to 223 to the clutches 225 to 228. Lines 220 to 223 are grounded at 236 so that the opening of switch bank 235 does not drop out any of the relays in the data storage circuit 212. A control circuit, described in more detail below, actuates solenoid 232 to make the clutch selection after the advance of the lower carriage 30 of the machine to a position adjacent the workpiece with the reading head 42 in sensing engagement with the drilling program plate 61. Shortly thereafter this control circuit energizes the spindle drive motor 231 which initiates rotation of the drill spindles 55 and 56.

The data storage circuit 212 shown in FIG. 8 is the same as the data storage circuit 122 in the feed depth control circuit 120, shown in FIG. 7. Suffice it to state that the holding relays 60CR to 63CR close their associated contacts 60CR1 to 63CR1 to store data after the reading head 42 moves away from the program plate opening switches 215 to 218. Reset relay 3RR opens normally closed contacts 3RR1 to 3RR4 to clear the previously stored data in the holding contacts when a new program is read at the machine station.

Each machine tool along the conveyor 12 is provided with a sequencing control circuit for initiating the various functions of the machine tool in response to the proper positioning of a workpiece adjacent the machine tool with the machine in sensing engagement with the proper program plate on the work carrier. It will be recalled that a hydraulic piston mechanism is provided for moving each machine from the retracted position away from the conveyor 12 to an advanced active position adjacent the workpiece. During this movement the reading heads, such as reading head 42, are advanced into engagement with the proper program on the workholder. A limit switch LS2 is provided on drilling machine 11, FIGS. 4 and 11, for sensing when the workholder is in proper engagement with the reading head. Limit switch LS2 is mounted in the rear of the locating opening 45 in the locating head 36 as shown in FIGS. 4 and 11. As will appear below, similar limit switches are provided for each machine along the conveyor.

Another limit switch, LS3, is provided on the drilling machine for sensing when the tool spindles 55 and 56 are fully retracted. Similar switches are provided on the other machines along the conveyor although they do not necessarily sense spindle retraction, as the purpose of these switches is merely to sense completion of the machine operations on the workpiece and the return of the tools to their starting positions. Note that LS3 senses the return of the tool spindle to its starting position and not the return of the entire machine to its retracted position which occurs subsequent to the spindle return as will appear more clearly hereinafter.

Referring to FIG. 9 wherein the sequencing circuit for drilling machine 11 is shown in detail, lines L1 and L2 are connected to a suitable source of supply. A start switch 250 is provided for energizing the control circuit. This switch is common to all the machines along the conveyor 12 so that their respective sequencing circuits may be energized simultaneously. It is unnecessary to depress the start switch 250 for each workpiece as each machine is fully under the control of the program plates 61 on the workholders 16. A holding relay SR in line C1 has contacts SR1 which maintain the holding relay energized after the start switch 250 is released.

The limit switch LS2 has contacts in line C4 and when closed energizes a time delay relay 1TD after the locating head of the machine is in engagement with the workholder. The time delay relay 1TD will not be energized unless one of the holding relays 40CR to 43CR is energized. This prevents initiation of the machine drive motors unless the workpiece is in the proper position and the machine has been programmed by a program plate 61. To accomplish this the holding relays have contacts 40CR2 to 43CR2 in parallel with the time delay relay 1TD so that if any of the contacts are closed when limit switch LS2 is closed the time delay relay will be energized. A predetermined time after energization of time delay relay 1TD, normally open contacts 1TD1 in line C2 will close. Contacts SR2 in line C2, closed by holding relay SR, remain closed after the start switch is closed. The slide feed motor 126 and the spindle speed motor 231 are then energized and movement of the tool toward the workpiece begins. Referring to line C7, limit switch LS2 also energizes solenoid 232 immediately upon registration of the locating head with the locating pins 72 and 73. This closes the switch bank 235 actuating the selected ones of the clutches 225 to 228. Solenoid 232 will not be energized however, unless one of the holding relays 60CR to 63CR is energized. This is effected by the normally open contacts 60CR2 to 63CR2 in line C7 arranged in parallel with the solenoid 232. In this manner the spindle driving clutches will be actuated before the time delay contacts 1TD1 energize the spindle drive motor 231.

After energization of the feed and drive motors, movement of the tool spindles 55 and 56 proceeds at a rapid rate until the wiper relay 207 is energized. This closes normally open contacts WB1 in line C5 which energize solenoid 182 initiating the slow feed of the spindles, as described above. Upon completion of the hole in the workpiece, wiper relays WA1, WA2 and WA3, FIG. 7, close contacts WA1A, WA2A, and WA3A, respectively, in line C3 of the sequencing circuit. When all of these contacts are closed, relay 15CR is energized thereby opening normally closed relay contacts 15CR1 in line C2 shutting off the slide feed motor 126. Simultaneously, a slide feed motor brake 253 is energized which is adapted to brake the tool slide 170 and prevent overtravel thereof past the desired command position counted by the wipers 165, 166 and 167. Relay 15CR also closes normally open contacts 15CR2 in line C6 energizing suitable reverse windings on the slide feed motor 126 and the spindle drive motor 231 to effect retraction of the spindle to its starting position. When the spindle reaches its retracted position, limit switch LS3, which is normally closed, is opened deenergizing the slide feed motor and the spindle drive motor. The tool functions are then complete, and the lower machine carriage is retracted from the workpiece along with the locating and reading head 42. This is effected by the hydraulic piston mechanism 32 on drilling machine 11, which actually is controlled by the conveyor control circuit described in detail below.

A conveyor drive mechanism 260 is provided as shown in FIG. 10 for advancing the workholders 16 from machine tool to machine tool along the conveyor 12. The conveyor drive itself is generally similar to that shown in the Cole Patent No. 2,139,403 and the details thereof form no part of the present invention. A hydraulic machine advancing circuit 261 is also shown in FIG. 10 for simultaneously advancing all the machines along the conveyor into sensing engagement with the program plates 61 on the workholders.

Referring briefly again to FIG. 11, a limit switch LS1 is provided for sensing when the lower carriage 30 of the drilling machine has been moved to the retracted position by the piston mechanism 32. Referring to FIG. 10, limit switches LS4 to LS10 are shown, one on each of the other machines along the conveyor for sensing the retracted position of their associated machines. Hydraulic piston and cylinder mechanisms P1 to P8 are provided, one for advancing each machine to the workpieces and for retracting the machine therefrom in the same manner as does the piston mechanism 32 described with reference to the drilling machine in FIG. 11.

Limit switches LS11 to LS17 are provided, as shown in FIG. 10, one in each of the locating heads 36, for sensing when the locating head is properly engaged with the locating pins 72 and 73 on the workholders 16. These switches perform the same function on the other machines as does limit switch LS2 on the drilling machine 11. A four way valve 263 is provided for selectively porting fluid under pressure from a suitable source 264 to the hydraulic lines 265 and 266; and for porting fluid from the hydraulic lines to a tank 267. Line 265 is connected to port fluid to and from the rear sides of each of the piston and cylinder mechanisms P1 to P8, while line 266 is connected to port fluid to and from the conveyor side of each of the piston and cylinder mechanisms. The valve 263 is actuated by a solenoid 268 and is arranged so that when the solenoid is energized the valve 263 will port fluid under pressure to line 265 and from line 266 to a suitable tank, and when deenergized will port fluid to line 266 and from line 265 to tank. The machine bases are thus advanced or retracted depending upon the state of the solenoid 268.

A conveyor drive motor 326 rotates the conveyor screw 25 through a transmission 270. The transmission 270 includes a main clutch 338, a fast feed clutch 339, a slow feed clutch 340, a second main clutch 341, and a conveyor brake 342. The main clutch 338 connects the motor 326 to the drive screw 25 to begin rotation of the screw. Clutch 341 completely disconnects the drive motor from the screw 25 to stop rotation of the screw. Clutch 339 is adapted to engage suitable gearing (not shown) in the transmission 270 to effect a fast rotation of the screw 25, while clutch 340 is adapted to engage suitable gearing to effect a slow rotation of screw 25 preparatory to stopping the screw. The brake 342 slows and stops the lead screw 25 when the workholders 16 are adjacent a machine tool station.

The conveyor drive motor 326 is connected through gearing 271 to rotate the conveyor control cams 328, 329, and 330. Gearing 271, connected to rotate with the screw 25 and stop when it stops, is designed to produce one revolution of the control cams 328, 329, and 330 for the number of revolutions of screw 25 necessary to move the workholders 16 from one machine to another.

Referring to FIG. 12, wherein a conveyor control circuit is shown, lines L3 and L4 are connected to a suitable source of supply (not shown). A start switch 345 is connected in line D1 to energize the conveyor drive motor when depressed. A holding relay 9CR and normally open contacts 9CR1 maintain energization of the drive motor 326 after the start switch is released.

After the motor is energized, clutch 338, in line D2, is closed initiating rotation of the conveyor screw 25. Simultaneously the control cams 328, 329 and 330 begin rotation. During the initial rotation of the cams, cam 328 maintains line D3 live and also maintains an actuation coil energized for the fast feed clutch 339. The cams, 328, 329 and 330, are arranged to actuate suitable switches (not shown) in an obvious manner when the high portions of the cams are in engagement with the switches. Cam 328 has a high portion which maintains the fast feed clutch actuated through most of the travel of the work carriers from one station to another. As the work carriers come within about three inches of the approaching machine tool, cam 328 deenergizes line D3 and the fast feed clutch releases. At the same instant, cam 329 has a high portion which then closes its associated switch thereby connecting a coil, adapted to actuate the slow feed clutch 40, to the source of supply. Line D5 is open during this time, but when the workholder arrives at the proper position adjacent a machine tool, a high portion on cam 330 then activates line D5 energizing clutch 340 to disconnect the motor 326 from the screw 25. The cams then stop their rotation. Another coil in line D5 is also energized at this time which actuates the brake 342 to rapidly stop the screw 25 and thereby prevents overtravel of the workholders past the machine tools.

The activation of line D5, as the workpiece arrives at the station, also energizes relay 11CR which has normally open contacts 11CR1 in line D6. Closure of contacts 11CR1 energizes solenoid 268 which moves valve 263 to a position to advance the machine bases into sensing and locating engagement with the workholders adjacent thereto. The closing of contacts 11CR1 also energizes relay 20CR in line D6 which has normally open contacts 20CR1 in line D7. Normally open limit switch LS3 and the corresponding switches on the other machines are connected in series in line D7. A time delay relay 2TD in line D7 opens its contacts 2TD2 in line D6 a predetermined time after the relay is energized to effect deenergization of solenoid 268 and the retraction of all the machine bases by the piston and cylinder mechanisms described above with respect to FIG. 10. If any one of the machines has not completed its machining cycle line D7 will not be energized, preventing the retraction of the machine bases. Relay 20CR prevents the time delay relay 2TD from holding line D6 open until after the advancing of the machine bases has been started.

After the machines are advanced into sensing engagement with the workholders, they machine the workpieces in accordance with the associated data commands. When the tool spindles return to their initial positions after the completion of the machining operation, the limit switch LS3, and those corresponding thereto on the other machines, close and activate line D7 and relay 2TD which opens contact 2TD2 and effects a retraction of all the machine bases.

When all of the machine bases arrive back at their inactive positions, limit switches LS1 to LS10 are closed energizing relay 13CR in line D9. Relay 13CR closes contacts 13CR1 in line D2 to actuate the main clutch 338 which begins the next advancing cycle of the conveyor by moving all workpieces toward the next machine tool station. Note that contact 13CR1 bypasses the normally closed contacts 11CR1 which are open at that time due to the energization of relay 11CR in line D5. A time delay relay 10TD assures that the brake will not be actuated at this time by holding contacts 10TD1 open for a short interval during the initial rotation of screw 25 until after the cam 330 opens line D5.

While the operation of the present programmed production line is believed obvious from the above detailed description, a summary of the operation of the device follows omitting some of the functions for the sake of clarity.

Merely by way of explanation of the operation of the present device assume that two series of workpieces are to be machined each consisting of 100 workpieces. And assume that it is desired that all the workpieces in the first series be machined identically, and that all the workpieces in the second series be machined identically, but that the desired machining operations on the first series are significantly different than those desired on the second series although there are some common operations in both series. The lead workpiece in the first series is fixed to a work carrier 16 which although identical to the other work carriers 16 may be termed the lead work carrier. One program plate 61 is programmed for each machine and fixed in the proper machine location in the recess 82 on the lead work carrier.

The lead work carrier is advanced down the conveyor by the conveyor advancing screw shown in FIGS. 2 and 10 followed by the other workpieces in the first series. The lead workpiece arrives at the first machine station, the drilling machine 11, moving from the right as shown in FIG. 1. After the screw stops, the conveyor control circuit of FIG. 12 advances the lower carriage on base and the reading head 42 of the drilling machine 11. The reading plungers 48 engage and are selectively depressed by certain program plungers 80 after the reading head is aligned by the projections 72 and 73. The actuation of selected reading plungers on the reading head 42 permits the reading of data into the storage registers 122, 191 and 212 in the drilling machine control circuit shown in FIGS. 7 and 8. The sequencing control circuit in the drilling machine 11 then initiates movement of the drilling spindies under the complete program control of the drilling machine program 61. After completion of the drilling operations on the lead workpiece in the first series, the conveyor control circuit retracts the reading head 42 from the lead work carrier and the workpieces are advanced to the next work station. The lead workpiece then arrives at the boring machine 10, as shown in FIG. 1, and the second workpiece arrives at the drilling machine 11. The conveyor control circuit, FIG. 12, advances the reading head 41 into sensing engagement with the boring machine program 61 on the lead work carrier and simultaneously advances the reading head 42 into locating engagement with the second work carrier. The boring machine program 61 on the lead work carrier programs the boring machine 10 in the same manner it did the drilling machine 11. However, since there are no program plates on the second work carrier, it will not program the drilling machine 11, and therefore the data storage circuits in the drilling machine will be activated to repeat the same drilling operations on the second workpiece in accordance with the program on the first lead work carrier.

The lead work carrier continues down the line from station to station programming every desired machine in a similar manner. Each machine thus programmed will repeat the programmed operations on every workpiece in the first series.

After the last workpiece in the first series has traversed the machine line, a second lead workpiece is fixed to a second series lead work carrier 16. Program plates 61 are fixed to the second lead carrier, one for each machine that is to perform different operations than it did on the first series. If a particular machine is to do the same operations on both series of workpieces, then no program plate 61 need be attached to the second lead work carrier for that machine. Further, if any of the machine functions are common to both series, the channel corresponding to that function on the machines program plate need not be programmed. For example, assume the spindle speed of the drilling machine 11 is the same for both series. In this case, the drilling machine code plate on the second lead work carrier need not carry a program in channel 77, as shown in FIG. 3. The plungers in channel 77 for the drilling machine may thus be left in their retracted positions.

The second lead work carrier is then advanced down the line from station to station. When it arrives at the drilling machine 11, the new data in channels 75 and 76 will clear the previously stored data corresponding to the feed depth and slow feed begin and read in the new data. Since channel 77 has no program, the data storage circuit 212 will effect a repeat of the spindle speed as commanded by the lead work carrier in the first series. The drilling machine 11 then performs the new and repeat functions on the lead workpiece in the second series. After the drilling machine retracts, the second lead work carrier is advanced from station to station in the same manner as the first series and programs each machine in accordance with the new code plates 61 on the second lead carrier. When the lead carrier arrives at a machine which has no associated program plate, all of the machine operations will be repeated in accordance with the data stored which was received from the lead workpiece of the first series. All of the workpieces in the second series are similarly fixed to work carriers and arranged to follow the lead workpiece in the second series. As with the following work carriers in the first series, these work carriers do not carry program plates 61 at all. Each machine along the conveyor 12 will then repeat on these workpieces all the operations they performed on the lead workpiece in the second series.

I claim:

1. In a machine tool production line with plural machine tools spaced along a work advancing conveyor; workholders fixed to said conveyor, data storage means connected to said workholders for controlling and programming the movement functions of the machines, sensing means associated with each of said machine tools for reading the data is said data storage means and controlling the machine functions, and means for indexing said workholders and data storage means from machine tool to machine tool along said conveyor.

2. A machine tool production line as defined in claim 1, and further including a data storage means for each machine for storing the sensed data and repeating the machine functions on workpieces following a workholder having data storage means connected thereto.

3. In a machine tool and workholder combination, a cutting tool on the machine, means for feeding the machine to the workpiece to engage the workholder, storage means on said workholder for storing data corresponding to the functions of the said machine tool, sensing means on said machine tool adjacent said storage means for sensing data on said storage means, and means on said machine tool for translating the sensed information into cutting tool movements, said feeding means being constructed to move said sensing means into sensing relationship with said data storage means.

4. A work supporting device for supporting a workpiece adjacent a machine which performs operations on the workpiece, comprising: a workholder, means on the workholder for fixing a workpiece thereto, code means on the workholder for controlling the operations of the machine on the workpiece including a plurality of binary coded channels each having a plurality of indicia representing a machine function, said channels being located on the workholder so that they face the machine.

5. A work supporting device as defined in claim 4, and further including locating means on said workholder adapted to engage said machine and align the workpiece and code means with respect thereto.

6. A work supporting device for carrying a workpiece between a plurality of machine tool stations where operations are performed on the workpiece, comprising: a workholder, means on said workholder for locating and fixing a workpiece thereon, and a plurality of programs on said workholder each adapted to control and program the operations to be performed at one of the machine tool stations, each of said programs including a plurality of binary channels, each of said channels having a plurality of indicia representing data for a predetermined machine function.

7. A work supporting device as defined in claim 6, and further including locating means on said workholder adapted to engage the work stations to align the workpiece and the programs with respect thereto.

8. A work supporting device for carrying a workpiece from one machine station to another, comprising: a workholder, means on the workholder for fixing a workpiece thereto, a plurality of programs on said workholder each adapted to command the operations to be performed at one of the machine stations; each of said programs including a plate member releasably mounted on said workholder, a plurality of channels on said plate each including a plurality of resettable plungers arranged in binary form, each of said channels being adapted to control one of the machine functions at one of the machine stations; and locating means on said workholder adapted to engage a portion of the machine station for locating the workpiece and the programs with respect to the machine station.

9. A work supporting device for carrying a workpiece from one machine station to another, comprising: a workholder, means on the workholder for clamping a workpiece thereon, a plurality of programs on said workholder for controlling the operations to be performed at the machine stations, each of said programs containing data to command the machine functions at one of the machine stations; each of said programs including a plate member releasably fixed to said workholder, a plurality of channels on said plate each including a plurality of resettable plungers arranged in binary form, each of said channels being adapted to command one of the machine functions at one of the machine stations; and locating means on said workholder adapted to engage a portion of the machine station for locating the workpiece and the programs with respect to the machine station.

10. An automated machine tool station, comprising: a machine tool for performing operations on a workpiece, a workholder adapted to support the workpiece adjacent the machine tool, means on the workholder for locating and fixing a workpiece thereto, program means on the workholder for controlling and programming the operations and functions of the machine tool on the workpiece including a plurality of binary coded channels, each of said channels representing a machine function, said channels being located on the workholder so that they are adjacent the machine tool, sensing means connected to said machine tool and adapted to sense data in each of said coded channels, and control means responsive to said sensing means for controlling a plurality of machine functions.

11. An automated production line wherein workpieces of a different character are transferred from one machine station to another, comprising: a conveyor for advancing the workpieces; a plurality of machine tools spaced along said conveyor; a plurality of workholders on said conveyor adapted to be advanced thereby from one machine tool to another, means on each of said workholders for locating and fixing a workpiece thereon, a plurality of programs on selected ones of said workholders, each program being adapted to command the functions of one of the machine tools, each of said programs including a plurality of coded channels, each of said channels containing data representing a predetermined machine function; locating means on each of the workholders adapted to engage corresponding locating means adjacent each of the machine tools to align the workpieces and the programs with respect to the machine tools; sensing means on each of the machine tools for reading data in one of the programs on the workholders, and control means on each of the machine tools responsive to said sensing means for controlling a plurality of the functions thereof.

12. An automated production line wherein workpieces of a different character are advanced from one machine station to another as defined in claim 11, wherein said control means includes means for storing the data sensed on one of said workholders, means for repeating the machine functions in accordance with the stored data on subsequent workpieces, and said storage means and said control means being responsive to a new program on a subsequent workholder to clear the stored data in the control means and to store the new data on the new program.

13. A machine tool transfer line, comprising: conveyor means, a plurality of work carrying means on said conveyor, drive means for indexing said work carrying means from station to station along said conveyor, a plurality of machine tools spaced along said conveyor at said stations, data receiving means associated with each of said machines for receiving data corresponding to the machine functions, control means in each machine responsive to said data receiving means for controlling the machine functions, a central source of data representing the desired functions of each machine along the conveyor, means for sensing the position of the work carrying means along said conveyor, and means responsive to said work carrying sensing means for transmitting the data from said central source to each of said data receiving means.

14. A machine tool transfer line, comprising: conveyor means, a plurality of work carrying means on said conveyor, drive means for indexing said work carrying means from station to station along said conveyor, a plurality of machine tools spaced along said conveyor at said stations, data receiving means associated with each of said machines for receiving data corresponding to all of the machine functions, control means in each machine responsive to said data receiving means for controlling the machine functions, a central source of data, said central source of data containing a program for each machine, each program containing data corresponding to the functions of each machine, means for sensing the position of at least one of said work carrying means as it indexes from station to station along the conveyor, and means responsive to said work carrying means sensing means for transmitting the program data to each of said data sensing means, said transmitting means being constructed to transmit data from the data source to the receiving means associated with the machine adjacent the sensed work carrying means, so that complete program data is transmitted to the data receiving means sequentially as the sensed work carrying means is indexed along the conveyor from station to station.

15. A machine tool transfer line, comprising: conveyor means, a plurality of work carrying means on said conveyor, drive means for indexing said work carrying means from station to station along said conveyor, a plurality of machine tools spaced along said conveyor at said stations, data receiving means associated with each of said machines for receiving data corresponding to all of the machine functions, control means in each machine responsive to said data receiving means for controlling the machine functions, a central source of data, said central source of data containing a program for each machine, each program containing data corresponding to the functions of each machine; means for sensing the position of each work carrying means carrying a workpiece upon which it is desired to vary the machining thereof from the preceding workpiece, identification means associated with each work carrying means carrying a workpiece upon which a change in program machining is desired, and sensing means adjacent each work station for sensing said identification means and thereby recognizing the work carrying means carrying a workpiece upon which it is desired to change the program machining thereof; and means responsive to said sensing means for transmitting the program data from said central source to each of said receiving means, said transmitting means being responsive to the sensing means adjacent the work station at which a new program is desired for transmitting a new program to the receiving means connected with the machine adjacent that station, whereby a selected workpiece will be indexed from station to station along the conveyor and the transmitting means will send a new program to each machine which is to perform new machining operation on the selected workpiece as the selected workpiece enters the station associated with the machine to be reprogrammed.

16. A machine tool transfer line as defined in claim 13 in which said central data source includes a program of data for each machine, each of said programs including a plurality of binary coded channels, each of said channels corresponding to one of the functions of the machine.

17. A machine tool transfer line as defined in claim 13, and including data storage means connected to each of said receiving means for repeating the transmitted functions on subsequent workpieces, and means responsive to said sensing means sensing the presence of a work carrying means carrying a workpiece upon which a new machine program is desired for clearing said storage means to receive a new program from said transmitting means.

18. A machine tool transfer line, comprising: conveyor means, a plurality of work carrying means on said conveyor, drive means for indexing said work carrying means from station to station along said conveyor, a plurality of machine tools spaced along said conveyor at said stations, data receiving means associated with each of said machines for receiving data corresponding to all of the machine functions, control means in each machine responsive to said data receiving means for controlling the machine functions, a central source of data representing the desired functions of each machine along the conveyor, means for sensing the position of the work carrying means along said conveyor, and means responsive to said work carrying sensing means for transmitting the data from said central source to each of said data receiving means.

19. A work supporting device for carrying a workpiece between a plurality of machine tool stations where operations are performed on the workpiece comprising: a workholder, means on said workholder for locating and fixing a workpiece thereon, and a plurality of programs on said workholder each adapted to control and program the operations to be performed at one of the machine tool stations, each of the programs including a plurality of channels, each of said channels containing data representing a predetermined machine function.

20. An automated production line in which workpieces of the same and different character are transferred from one machine station to another comprising: a conveyor for advancing the workpieces, a plurality of machine tools spaced along said conveyor, a plurality of workholders on said conveyor adapted to be advanced thereby from one machine tool to another, means on each of said workholders for locating and fixing a workpiece thereon, data storage means associated with each of the machine tools for storing command data for machine movement functions, means for transferring data from a source to said data storage means, program data means for modifying the program of selected functions in the storage means associated with selected machine tools, said program data means being indexed with said workholders from one machine tool to another, and means associated with each of said machine tools for transferring data from said program data means to the associated storage means to thereby modify a selected program previously stored in selected ones of said storage means without completely changing the previous program or without requiring a completely new program on said program data means.

21. A machine tool adapted to be programmed by an external source of data, comprising: a machine base, a tool mounted on said base for movement, said tool extending from one side of said base, control means for varying the functions of the tool, sensing means on said base extending from said one side thereof, said sensing means including means for reading coded data adjacent said tool side of the machine, said sensing means includes a plurality of channels each connected to control a machine function, said channels including a plurality of reading plungers arranged in binary form, and said control means having means for decoding the data in at least one of said channels.

22. A machine tool adapted to be programmed by an external source of data, comprising: a machine base, a tool mounted on said base for movement, said tool extending from one side of said base, control means for varying the functions of the tool, sensing means on said base extending from said one side thereof, said sensing means including means for reading coded data adjacent said tool side of the machine, said sensing means including a plurality of channels each connected to control a machine function, said channels including a plurality of reading plungers arranged in binary form, and said control means having means for decoding the data in at least one of said channels, said machine base is mounted for horizontal movement whereby the reading means may be brought into engagement with a coded program adjacent thereto, and locating means on said one side of said base for locating the machine tool with respect to the workpiece and program.

23. In a machine tool production line a plurality of machine tools spaced along a work advancing conveyor; workholders adapted to be advanced from one machine tool to another by said conveyor, data storage means associated with said conveyor for controlling and programming the movement functions of the machines, means connecting said data storage means with said conveyor for advancing said data storage means from machine tool to machine tool, and sensing means associated with each of said machine tools for reading the data in said data storage means and controlling the machine functions of the associated machine tool.

24. In a machine tool production line as defined in claim 23, and further including automatic means for bringing said sensing means into sensing relationship with said data storage means when the data storage means are indexed adjacent the sensing means by the conveyor, said sensing means being responsive to said sensing relationship for automatically reading the data in said data storage means, and control means responsive to said sensing means for controlling the movements of the associated machine tool in accordance with the program data on said data storage means.

25. A machine tool adapted to be programmed by an external source of data, comprising: a machine base, a tool mounted on said base for movement, said tool extending from one side of said base, control means for varying the functions of the tool, sensing means on said base extending from said one side thereof, said sensing means including means for reading coded data adjacent said tool side of the machine, said sensing means including a plurality of channels each connected to control the extent of one of the machine functions.

References Cited by the Examiner
UNITED STATES PATENTS

| | | | |
|---|---|---|---|
| 2,883,912 | 4/1959 | Billman et al. | 90—13 |
| 2,947,203 | 8/1960 | Ausenda et al. | 77—5 |
| 2,969,137 | 1/1961 | Baumann et al. | 198—38 |

WILLIAM W. DYER, Jr., *Primary Examiner.*

G. A. DOST, *Assistant Examiner.*